United States Patent [19]

O'Connor

[11] 3,794,981

[45] Feb. 26, 1974

[54] REALTIME COMPUTER OPERATION

[75] Inventor: Daniel G. O'Connor, Endwell, N.Y.

[73] Assignee: The Singer Company, Binghamton, N.Y.

[22] Filed: June 2, 1972

[21] Appl. No.: 258,997

[52] U.S. Cl. ............ 340/172.5, 340/146.2, 235/156

[51] Int. Cl. ............ G06f 7/04

[58] Field of Search ............ 340/172.5, 149, 146.2; 235/156, 160, 164, 168, 180; 444/1

[56] References Cited

UNITED STATES PATENTS

| | | | |
|---|---|---|---|
| 3,344,406 | 9/1967 | Vinal | 340/172.5 |
| 3,311,893 | 3/1967 | Landell | 340/172.5 |
| 3,501,750 | 3/1970 | Webb | 340/172.5 |
| 3,401,376 | 9/1968 | Barnes et al. | 340/172.5 |

*Primary Examiner*—Paul J. Henon
*Assistant Examiner*—John P. Vandenburg
*Attorney, Agent, or Firm*—William Grobman; James C. Kesterson

[57] ABSTRACT

In realtime systems which are controlled by digital computers, information is updated at prescribed time intervals regardless of whether or not there have been changes in the input values. This specification discloses a system for comparing the new values with the previous values for the same quantities and for reducing or eliminating computations performed by the computer when the values have not changed more than the prescribed amount. A digital comparator compares the old value from memory with the new value being transmitted to memory. When the difference between the two is within a prescribed amount, the output of the comparator signals the computer to ignore that computation and proceed to the next step.

4 Claims, 4 Drawing Figures

REALTIME COMPUTER OPERATION

BACKGROUND OF THE INVENTION

1. Field of the Invention

This invention relates to realtime computer systems and more particularly to systems which utilize digital computer systems for realtime and digital control.

2. Prior Art

There is nothing new in using a digital computer for operation and control of many systems. One field in which digital computers have been used extensively is in the realtime control of simulators, particularly those which simulate complex systems. In simulators of that nature, mathematical expressions which represent the operation of the system being simulated are programmed into the computer. Initial values for the variables in these mathematical expressions are inserted by an instructor or some other source to initiate operation of the simulator. As the simulator proceeds through its prescribed mission, the initial values are used in computations of the mathematical expressions to produce resultant values. The resultant values are then applied to the various portions of the simulator to drive them. Driving the simulator itself causes changes in the values of the variables which make up the mathematical expressions. In addition, the values of these variables may also be changed by actions taken by an instructor or by a trainee using the simulator. Since the simulator, including the computer, is a closed system; the values of the variables used in the computations must be continually updated. Updating is performed at a prescribed rate which is determined by the resolution desired in the operation of the simulator, the loading of the computer itself, and the rate of change of the variables. Often to achieve the desired resolution of the operation, large computer complexes are required. From the view of both initial cost and maintenance cost it is desirable to maintain the size and number of the computers required to a minimum.

SUMMARY OF THE INVENTION

This invention is designed to decrease the computer requirements in complex systems by decreasing, where possible, the frequency at which computations are performed. This is achieved by comparing new input values for each variable with the last value for the same variable during each update procedure. When the value of any variable has not changed at all or has changed by only a small amount, a signal is generated to indicate to the computer that the equations using this variable need not be recomputed.

It is an object of this invention to provide a new and improved computer control system for complex apparatus.

It is another object of this invention to provide a new and improved computer system for decreasing the loading on the computer.

It is a further object of this invention to provide a new and improved system for the operation of digital computers in complex computer systems.

Other objects and advantages of this invention will become more apparent as the following description proceeds, which description should be considered together with the accompanying drawings.

Figure 1:
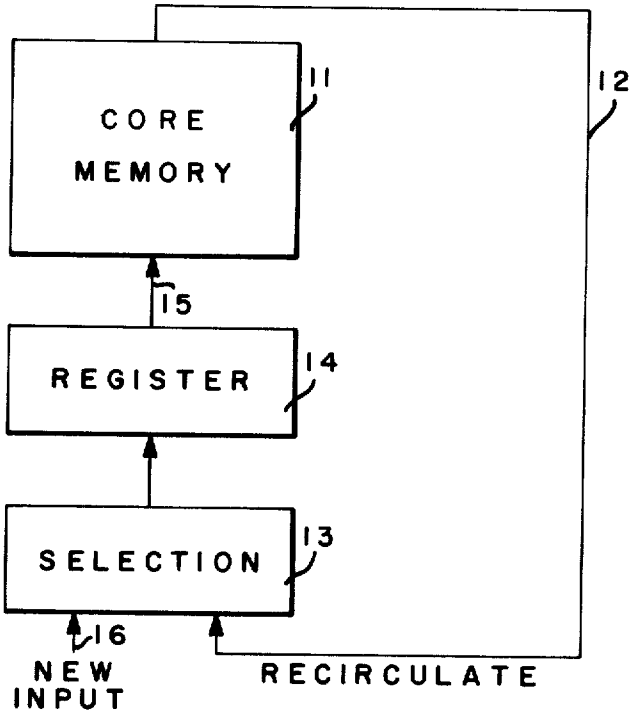
FIG. 1 is a broad block diagram of prior art systems.

Referring to the drawings in detail and more particularly to FIG. 1, the reference character 11 designates a digital memory such as a magnetic core array. The output from the memory 11 is applied through a data transmittal path 12 to one input of a selection circuit 13. The output of the selection circuit 13 applied to the input of a register 14 whose output is connected to the input of the core memory 11 through a data path 15. New information is supplied to the selection circuit 13 through a new input path 16.

The diagram of FIG. 1 is very broad and shows enough of the prior art system to indicate prior art operation for purposes of this discussion. The apparatus shown in FIG. 1 is a small portion of a large system which utilizes a computer for control purposes. Information and instructions are stored in the core memory 11. When the system updates the information stored in the memory 11, information is read from the cores at the addresses where the updating is to take place and is transmitted along path 12 to the input of a selection circuit 13. If a read operation is being performed, the information in the path 12 is also applied to other external systems for whatever use is intended for that information. If a write operation is taking place, information is read from the cores and is transmitted along the path 12 and new information supplied along the path 16 is written into those cores from which the information was read. The selection circuit 13 determines from the type of operation being carried out whether information coming in along the path 12 or information coming in along the path 16 will be transmitted to the register 14 and the path 15 for writing into the memory and can comprise any suitable channel selector such as the channel selection unit 24 shown in U. S. Pat. No. 3,344,406 to Vinal. During a read operation, the information is usually returned to memory through a regeneration circuit so that the shape and timing of memory pulses is maintained as accurately as possible. Thus, it can be seen that regardless of whether a read operation or a write operation is being carried out, information is read from memory, is applied to the selection circuit 13, and then may be rewritten into the memory or not. Thus, the selection circuit 13 has information applied to it from the path 12 for both the write and the read operations.

In a large complex system which utilizes computers for operation and control purposes, the values of the variables in the equations computed by the computer are continually being updated by information originating outside the complex system itself. The updating usually involves a write operation in which the new values are transmitted along the input path 16 to the selection circuit. Often many of the values remain constant over long periods of time. In the prior art system, the same values may be repeatedly reinserted into the core memory 11 from the path 16 and the computer continues to perform the same computations and produces the same results over that period of time during which nothing has changed. In other words, in the prior art, the computer performed needless computations.

Figure 2:
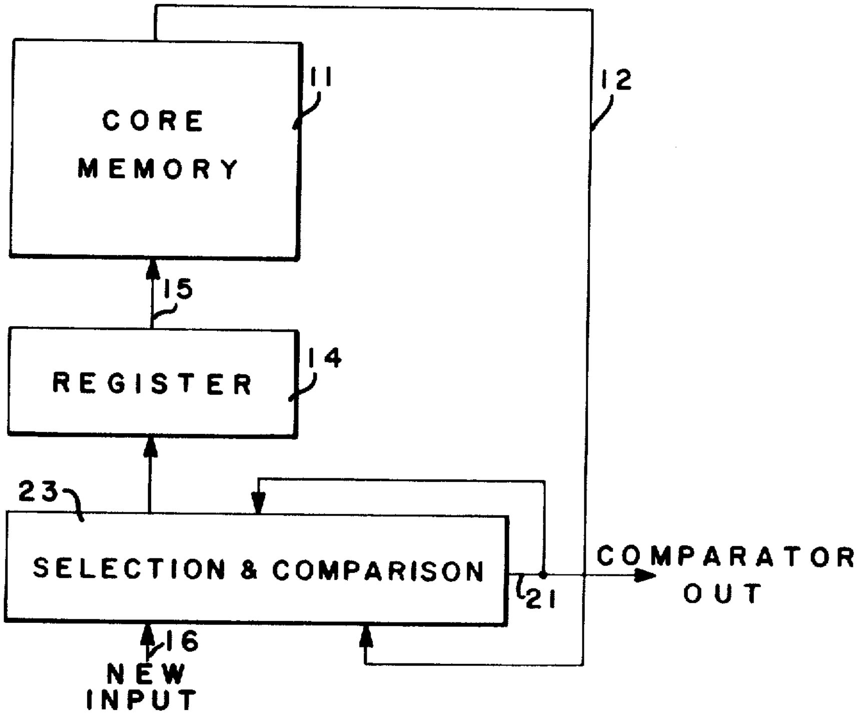
FIG. 2 is a broad block diagram of one system in accordance with this invention.

FIG. 2 discloses a simple means for overcoming some of the problems of FIG. 1. In FIG. 2, a core memory 11 has its output connected to an output information path 12 which supplies one input to a selection and comparison circuit 23 which may be any suitable comparison circuit and any suitable selection circuit such as the selection unit 24 and the comparison circuit of FIG. 2*d*, both of the patent to Vinal. The output from the selection and comparison circuit 23 is applied to a register 14 and through a data path 15 from the register 14 to an input of the core memory 11. New information is supplied along an information path 16 to another input of the selection and comparison circuit 23. An output from the comparison and selection circuit 23 taken along an output line 21.

The system of FIG. 2 differs from the system of FIG. 1 in the incorporation of a comparison circuit with the selection to provide a combination selection and comparison circuit 23. References to FIG. 1 indicate that the selection circuit 13 therein had two inputs 12 and 16. The same is true of the composite circuit 23 of FIG. 2. However, the composite circuit 23 of FIG. 2 performs two functions. When information is transmitted to the two inputs 16 and 12, their values are compared in the comparison portion of the circuit 23 and the signal generated on the output 21 helps determine which information will be transmitted to the register 14 for writing into the core memory 11. If the comparison output on the line 21 indicates that the information read from the memory 11 is different from the information applied along the information path 16, then the information from the path 16 is applied to the register 14. However, should the information coming in on the two inputs be the same, then the information supplied on either input 12 or 16 is applied to the register 14. It is, of course, understood that the contents of the register 14 are written into the core memory 11. At the same time, the output of the line 21 which indicates that the information applied along the two inputs 12 and 16 was the same, is applied to a storage register as a flag or comparison signal. When all of the variables in any particular computation are represented by flags or comparison signals stored in the appropriate register, the computer does not perform that computation but steps to the next operation instead. In this manner, during those intervals when input signals are not changing at all, the computer need not perform all of its computations. This relieves the computer of unnecessary loading and permits it to operate with a smaller spare capacity.

Figure 3:
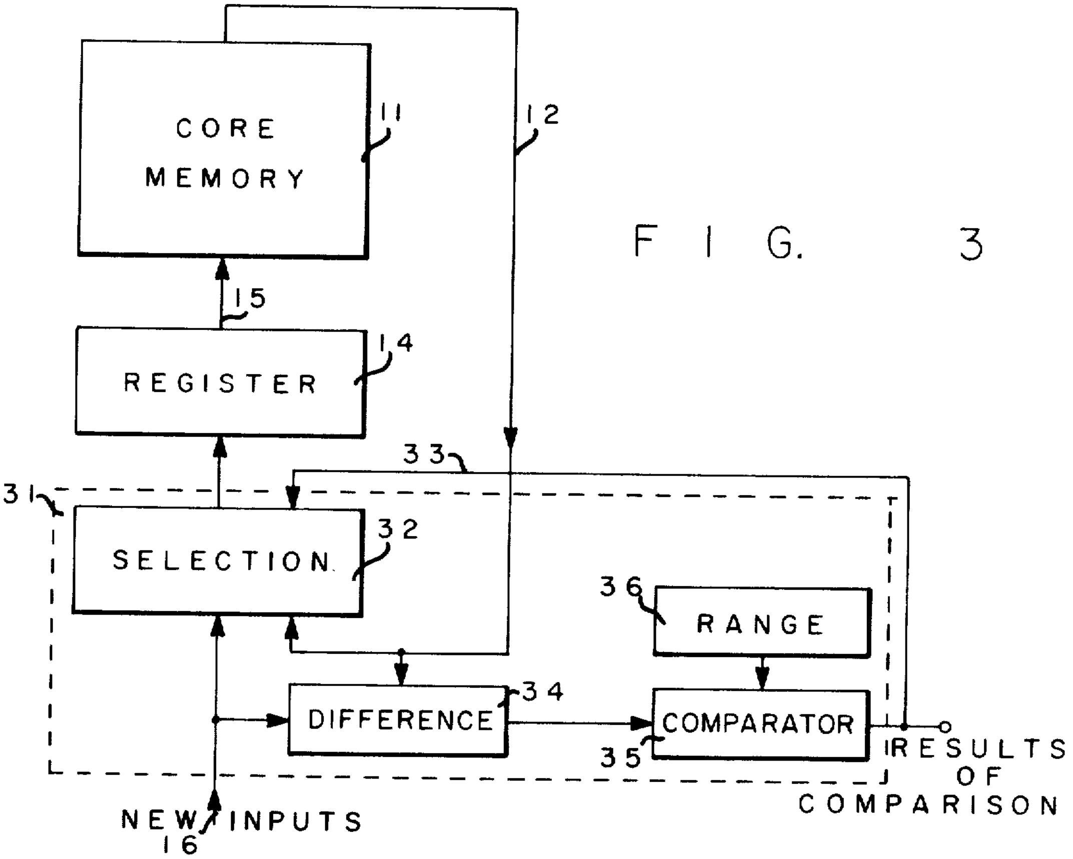
FIG. 3 is a broad block diagram of another system utilizing this invention.

The system of FIG. 2 is an improvement over the system of FIG. 1, but with an additional small amount of apparatus the overall system can be improved still further. In FIG. 3, the core memory 11 has an output information path 12 which is connected to the input of a selection circuit 32 and a difference circuit 34. The output of the selection circuit 32 is applied to the input of a register 14 whose output is applied along an information path 15 to the input of the memory 11. The selection circuit 32 is one component in a selection and comparison device 31. Within the device 31 is included the difference circuit 34 and the comparator 35, and a new information path 16 is applied to a second input of the selection circuit 32 and to a second input of the difference circuit 34. The output of the difference circuit 34 is applied to the input of the comparator 36 which also receives the input from a range register 36. The output of the comparator 35 is applied along a signal line 33 to a control input of the selection circuit 32 and also along a line 37 to the computer control circuits.

Consider again that in the overall system shown in FIG. 3, new information for updating is applied along the information path 16. At this time, information is read from prescribed addresses in the core memory 11 and is applied along the information path 12. The information supplied along the two paths 12 and 16 are both applied as separate inputs to the difference circuit 34. The difference circuit 34 subtracts one from the other and generates an output proportional to the difference in value between the two, and then applies that difference to one input of the comparator 35. The comparator 35 also receives digital information representing a prescribed range of values from the range register 36. When the difference from the difference circuit 35 is not within the range supplied from the register 36, the comparator 35 generates an appropriate output signal which is applied to the selection circuit 33 indicating to that selection that it apply the information from the path 16 to the register 14. At the same time, the signal is applied along the line 37 to an appropriate register to indicate the new value supplied along the path 16 is not within the update range. When no such signal is applied along the line 33, the selection circuit 32 applies the information it receives along the path 12 to the register 14.

As indicated above, the system of FIG. 2 provides a substantial improvement over the old system shown in FIG. 1. However, the system of FIG. 2 operates only when the new updated information is exactly the same value as the information read from the memory 11. Since the chances of all changes in an equation meeting that limited criterion is extremely small, the system of FIG. 2 does not provide a very large improvement over the system of FIG. 1. When the criterion is changed so that the change in value between the new updated value and the value of the information read from the memory 11 is within a prescribed range-that range being determined by the resolution desired-then the chances of all of the changes of a given equation falling within that range is much greater. This enables the computer to avoid a large number of computations when utilizing the system of FIG. 3 than it would when it utilizes the system of FIG. 2. In the system of FIG. 3, should the value of a variable change by a very small amount each time it is updated or a number of updates, the total accumulated change may become large. If the new values are repeatedly written into the memory 11, then the system would continually indicate no change. Therefore, whenever the output of the comparator 35 indicates along the line 33 that the difference between the update values and the value read from the memory 11 is within the specified tolerance, the original information read from the memory 11 must be rewritten into the memory 11. After two or three updates, the difference between the new information supplied along the path 16 and the information read from the memory 11 will have grown to the point where it is outside the range specified along the path 36, and the new information will then be written into the memory 11. The use of the range of changes also causes the computer to ignore small, random changes which do not exceed the range even when accumulated. As indicated above, the output of the comparator 35 is transmitted along the line 37 to a register, preferably a shift register, where it is stored. This register stores all of the signals applied to it, representing the status of the update information for all of the variables in any individual computation. Should the register be filled with such signals, it serves to indicate to the computer that none of the values of the variables in that computation have changed sufficiently to warrant recomputing.

Figure 4:
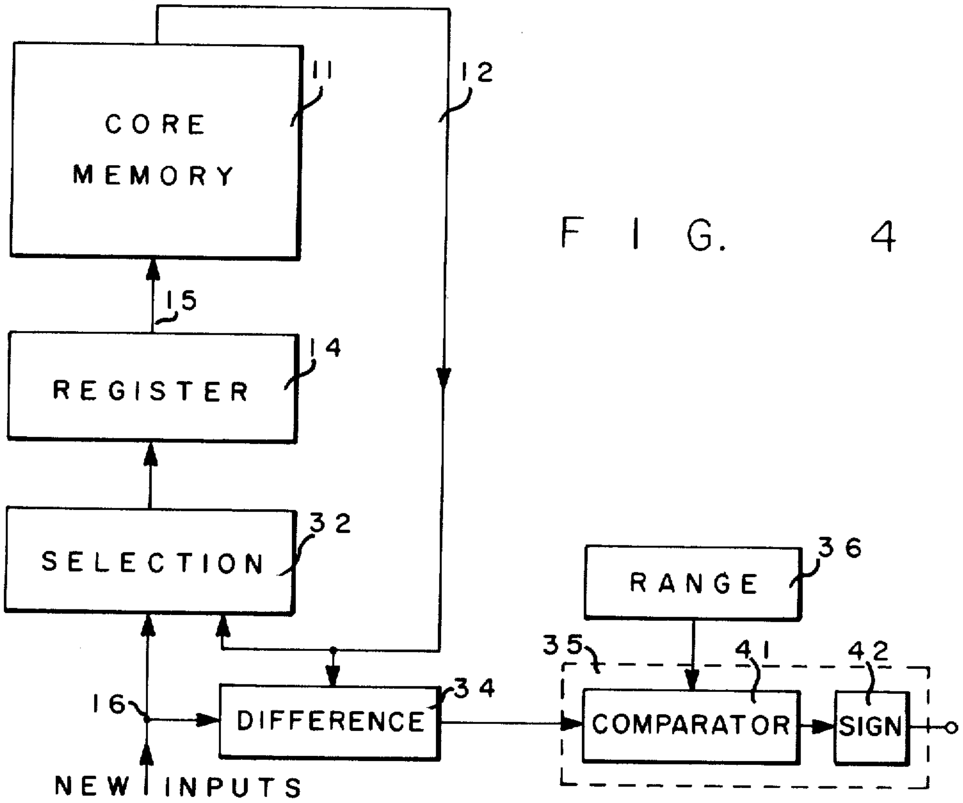
FIG. 4 is a logical block diagram of an example of a comparator suitable for use in the system of FIG. 3.

FIG. 4 shows one form of comparator which indicates when the difference between the information on the paths 12 and 16 differ by an amount within the prescribed range. In FIG. 4, information read from the memory is applied to an input of the selection circuit along the path 12, and new information supplied from external sources or stimuli is applied to another input of the selection circuit 32 by path 16. The difference circuit 34 has the two paths 12 and 16 also connected to its two inputs, and the output of the difference device 34 is applied to an input of a second difference circuit 41. The second input of the difference device 41 is connected to the output of the range register 36. A sign detector 42 has its input connected to the output of the difference device 41, and its output supplies the output of the comparator 35 which comprises the difference device 41 and the sign detector 42.

In operation, the difference circuit 34 receives the information read from memory and supplied along the path 12 and the new information supplied along the path 16 and subtracts one from the other. It makes little difference which of the two inputs is the minuend, but for the purpose of this discussion, the input from the path 12 is considered to be the minuend. Should the value of the information supplied from path 12 be larger than the value of the information along the path 16, the output of the difference device 34 is positive; should the reverse be true, then the output of the difference device 34 will be negative. The sign of the output of the difference circuit 34 is ignored, and the absolute value of the difference is applied to one input of the difference device 41. In this case, the contents of the range register 36 is always considered to be the minuend. The difference device 41 subtracts the output of the difference device 34 from the contents of the range register, and if the result is equal to or greater than zero (positive), the difference between the information on the two paths 12 and 16 lies within the specified range. If, however, the output of the difference device 41 is negative, then the difference between the information on the two paths 12 and 16 lies outside of the specified range, and the sign detector 42 generates an output signal. The sign generator 42 may, if desired, merely sense the first digit of the output from the difference device 41, or any other form of sign detector may be used.

This specification has described a new and improved apparatus and method for decreasing the loading of a digital computer in many situations. It is realized that the above description may indicate to others in the art additional ways in which the principles of this invention may be used without departing from its spirit. It is, therefore, intended that this invention be limited only by the scope of the appended claims.

What is claimed is:

1. A digital computer system comprising a digital computer, a main memory connected to said computer, said main memory having stored therein at assigned addresses values of independent variables, said computer periodically and sequentially reading the values of said independent variables from said main memory to compute the values of independent variables, means connected to said memory for periodically and sequentially supplying to said memory newly updated values for said independent variables, comparison means having a first input connected to the output from said memory and a second input connected to said means for supplying updated values, said comparison means generating an output signal whenever the difference in value between its first and second inputs is less than a prescribed amount, first means responsive to said output signal for writing said value from memory back into its memory address and for preventing the writing of said updated value into said memory address, and second means responsive to said output signal for indicating to said computer that the computations involving the particular independent variables which generated said output signal should be omitted.

2. The apparatus defined in claim 1, wherein said comparison means includes a difference device, means for applying said values read from memory and said updated values to said difference device, and means for comparing the output from said difference device with a constant value to produce said output signal.

3. The apparatus defined in claim 2 wherein said comparison means further includes storage means for storing said constant value and a comparator connected to the output of said difference device and said storage means.

4. A method of reducing the computation load on a digital computer which includes a memory with stored values of independent variables generated by an outside source, said method comprising the steps of:

a. Reading stored values from memory and receiving update values from an outside source;

b. Comparing the values read from memory and said update values for equality;

c. Generating a signal when the values read from memory differ from said update values by less than a prescribed amount; and d. Applying said signal to said computer to omit computations using the the variables being updated when said signal is generated.

* * * * *

UNITED STATES PATENT OFFICE

CERTIFICATE OF CORRECTION

Patent No. 3,794,981 Dated February 26, 1974

Inventor(s) Daniel G. O'Connor

It is certified that error appears in the above-identified patent and that said Letters Patent are hereby corrected as shown below:

Column 2, line 15, after "13" insert --is--; and
line 35, after "12" insert a comma (--, --).
Column 3, line 20, after "selection" insert --circuit--.

Signed and sealed this 6th day of August 1974.

(SEAL)
Attest:

McCOY M. GIBSON, JR.
Attesting Officer

C. MARSHALL DANN
Commissioner of Patents